(12) United States Patent
Meyer et al.

(10) Patent No.: US 8,442,960 B1
(45) Date of Patent: May 14, 2013

(54) SYSTEMS AND METHODS FOR PROCESS SELF-ELEVATION

(75) Inventors: Kenneth Meyer, Novi, MI (US); Gary Chirhart, Milford, MI (US); Andrew Marks, Ypsilanti, MI (US)

(73) Assignee: Symantec Corporation, Mountain View, CA (US)

( * ) Notice: Subject to any disclaimer, the term of this patent is extended or adjusted under 35 U.S.C. 154(b) by 1049 days.

(21) Appl. No.: 12/165,003

(22) Filed: Jun. 30, 2008

(51) Int. Cl.
| | |
|---|---|
| *G06F 7/00* | (2006.01) |
| *G06F 17/00* | (2006.01) |
| *G06F 7/04* | (2006.01) |
| *G06F 17/30* | (2006.01) |
| *H04L 29/06* | (2006.01) |
| *H04N 7/16* | (2011.01) |

(52) U.S. Cl.
USPC ............................. 707/694; 713/166; 726/27

(58) Field of Classification Search .................. 707/694; 713/166
See application file for complete search history.

(56) References Cited

U.S. PATENT DOCUMENTS

| | | | | |
|---|---|---|---|---|
| 6,449,652 | B1 * | 9/2002 | Blumenau et al. | 709/229 |
| 7,167,530 | B2 * | 1/2007 | Koomullil et al. | 375/329 |
| 7,941,861 | B2 * | 5/2011 | van der Bogert et al. | 726/28 |
| 7,945,951 | B2 * | 5/2011 | Yadav et al. | 726/21 |
| 8,024,813 | B2 * | 9/2011 | Hong et al. | 726/28 |
| 2005/0071633 | A1 * | 3/2005 | Rothstein | 713/167 |
| 2005/0289555 | A1 * | 12/2005 | Jiang et al. | 719/310 |
| 2006/0242422 | A1 * | 10/2006 | Hong et al. | 713/182 |
| 2006/0242713 | A1 * | 10/2006 | Ruzyski et al. | 726/26 |
| 2007/0016773 | A1 * | 1/2007 | Perlman et al. | 713/166 |
| 2007/0079372 | A1 * | 4/2007 | Lambert et al. | 726/22 |
| 2007/0180501 | A1 * | 8/2007 | Yadav et al. | 726/5 |
| 2007/0180502 | A1 * | 8/2007 | Yadav et al. | 726/5 |
| 2007/0198933 | A1 * | 8/2007 | van der Bogert et al. | 715/741 |
| 2007/0198934 | A1 * | 8/2007 | Averett et al. | 715/741 |
| 2007/0199068 | A1 * | 8/2007 | Russinovich et al. | 726/16 |
| 2007/0199072 | A1 * | 8/2007 | Plummer | 726/26 |
| 2008/0109396 | A1 * | 5/2008 | Kacin | 707/1 |
| 2009/0300532 | A1 * | 12/2009 | Cowan | 715/771 |

OTHER PUBLICATIONS

"Windows Installer Deployment on Windows Vista," http://msdn.microsoft.com/en-us/library/bb384154.aspx, Nov. 2007, Microsoft Corporation.

Flaming, "Tribal Knowledge in Software Logistics," http://blogs.msdn.com/rflaming/archive/2006/09/30, Nov. 30, 2006, Microsoft Corporation.

"Windows Installer Team Blog," http://blogs.msdn.com/windows_installer_team/default.aspx?p=3, Sep. 1, 2007, Microsoft Corporation.

"Multiple Instance MSI's and InstallShield 12," Deployment Engineering.com—The Blog, http://blog.deploymentengineering.com/2006/10/multiple-instance-msis-and.html, Oct. 26, 2006.

* cited by examiner

*Primary Examiner* — Jeffrey A Burke (74) *Attorney, Agent, or Firm* — ALG Intellectual Property, LLC (57) ABSTRACT

A computer-implemented method for elevating privileges for a process may comprise: 1) determining that the process requires elevated privileges for proper execution, 2) attempting to elevate privileges for the process, 3) determining whether privileges for the process were elevated, and 4) concluding execution of the process. In one example, each step of the method may be performed by the process itself. Corresponding systems and computer-readable media are also disclosed.

16 Claims, 5 Drawing Sheets

SYSTEMS AND METHODS FOR PROCESS SELF-ELEVATION

BACKGROUND

Some modern operating systems attempt to prevent unauthorized applications or programs from running on computing systems by limiting the privilege levels granted to such applications or programs. For example, an operating system may assign reduced or "standard" privileges to an application until a user with full or "administrative" privileges explicitly grants higher privileges to the application. In theory, since an administrator should only grant full or administrative privileges to trusted applications, malware should be kept from receiving the privileges necessary to access or compromise protected computing resources.

For example, an operating system may require that an administrator or user of a computing system approve any attempt to install application software on the computing system. However, because some operating systems prevent privileges for a process from being changed once the process has started, an executable wrapper may be used to launch the process with privileges to begin with. For example, an executable wrapper for an application may be used to prompt the administrator or user of the computing system for permission to temporarily elevate privileges for the application so that the application may be properly installed.

Some applications require access to protected computing resources (and thus require elevated privileges) even after they have been successfully installed. For example, an application installed in a WINDOWS environment may require access to protected computing resources (such as protected web-server information) in order to be modified or updated via the "Programs and Features" control panel applet. Unfortunately, unless an executable wrapper is used to modify or update applications installed in such an environment, elevated privileges for the application may not be requested or obtained, such that modification or update of the application may fail. Use of such an executable wrapper is not, however, always possible, practical, or desirable. In such cases, an alternative method may be required to launch the same process with elevated privileges.

SUMMARY

Embodiments of the instant disclosure are directed to providing a method for process self-elevation. As will be described in greater detail below, "self-elevation" may refer to initiating an attempt to elevate privileges within a process, as opposed to obtaining elevated privileges from a calling process (e.g., executable wrapper) that has already been granted elevated privileges. In one embodiment, and as will be described in greater detail below, the exemplary systems and methods described herein may enable a computing system to elevate privileges for a process without requiring the use of an executable wrapper. As such, a computing system or user of the same may perform a maintenance operation on a previously installed application that requires access to protected computer resources without the use of an executable wrapper.

In one example, a method for elevating privileges for a process may comprise: 1) determining whether the process requires elevated privileges for proper execution, 2) if the process requires elevated privileges, attempting to elevate privileges for the process, 3) determining whether privileges for the process were elevated, and 4) concluding execution of the process. In one embodiment, embedded instructions within the process may perform (or at the very least initialize) each step of the method.

The process may represent an installation process, an application-maintenance process, or any other process or operation that may require access to protected computer resources. In certain embodiments, the process may represent a set of processes, such as a parent process and a child process, one or more of which may be elevated or non-elevated.

In certain examples, the system may attempt to elevate privileges for the process by suspending a non-elevated instance of the process and, while the non-elevated instance of the process is suspended, attempting to spawn or create an elevated instance of the process. In this example, the non-elevated instance may wait for the elevated instance to complete before exiting or concluding operation. Upon exiting, the non-elevated instance may return the same value as the spawned, elevated instance.

In the preceding example, the system may determine whether privileges for the process were elevated by determining whether the attempt to spawn the elevated instance of the process was successful. In certain examples, the system may store process-identification information for the process that may aid the system in resuming execution of the process after privileges for the process have been elevated.

In non-WINDOWS environments, the computing system may attempt to elevate privileges for the process by: 1) attempting to elevate privileges for the process or a non-elevated instance of the process and/or 2) prompting a user to elevate privileges when an operating system of the process does not provide an elevation prompt.

If the system is unable to elevate privileges for the process, then the system may prevent the process from continuing to execute or completing execution. Alternatively, the system may only execute instructions associated with the process that do not require elevated privileges. However, if the system is able to successfully elevate privileges for the process, then the system may allow the process to proceed with its normal execution. After the process has concluded, the computing system may return privileges for the process to their pre-elevation state.

Corresponding systems and computer-readable media are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for process self-elevation (i.e., initiating an attempt to elevate privileges within a process, as opposed to obtaining elevated privileges from an external process, such as an executable wrapper, that has already been granted elevated privileges). In particular, as detailed below, the systems and methods described herein may enable a computing system to elevate privileges for a process without requiring the use of an executable wrapper. The phrase "privileges," as used herein, generally refers to a level of permission that can be granted to a user or process. Similarly, the phrase "elevate privileges" may refer to raising the permission level of a process.

Figure 1:
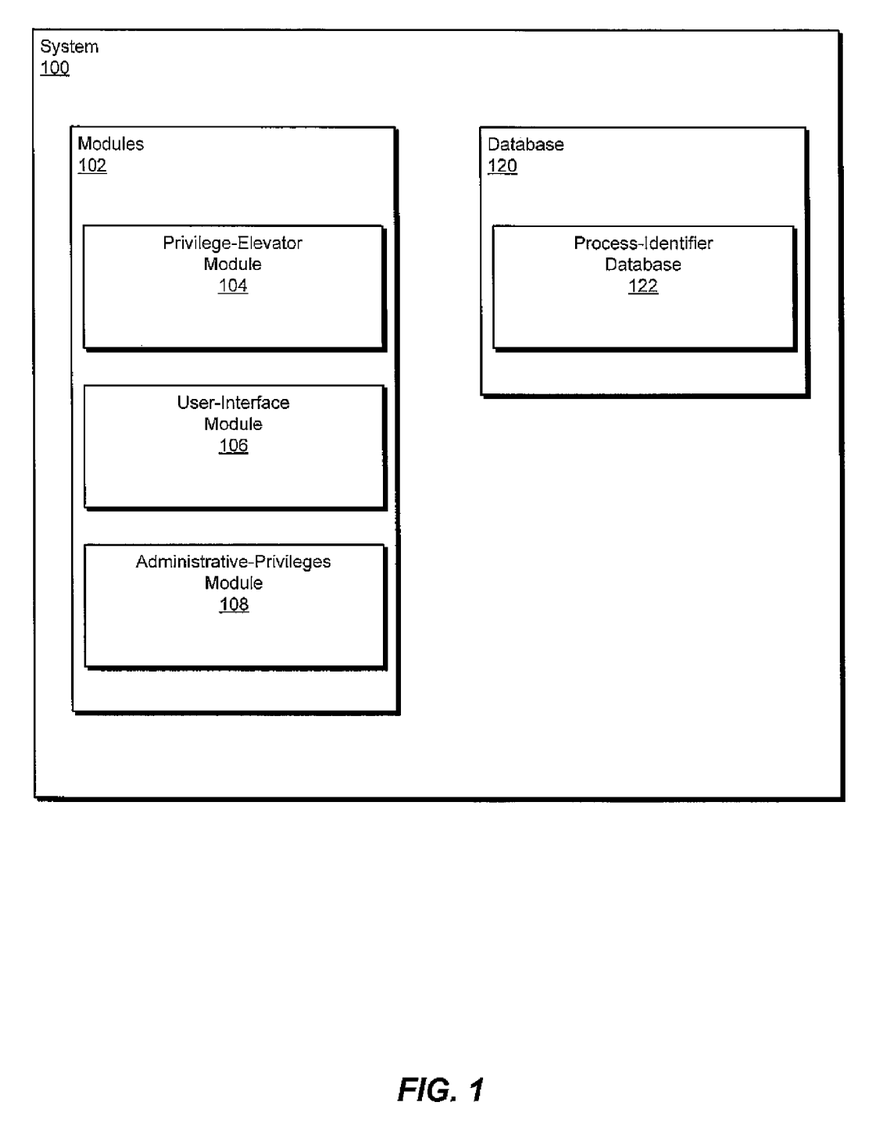
FIG. 1 is a block diagram of an exemplary system for elevating privileges for a process according to at least one embodiment.

The following will provide, with reference to FIG. 1, detailed descriptions of exemplary systems for elevating privileges for a process without implementing an executable wrapper. A description of an exemplary user interface for prompting a user to determine whether to elevate privileges for a process is provided in connection with FIG. 3. A detailed description of a corresponding exemplary computer-implemented method will also be provided in connection with FIG. 2.

FIG. 1 is a block diagram of an exemplary system 100 for elevating privileges for a process. As illustrated in this figure, exemplary system 100 may comprise one or more modules 102 for performing one or more tasks. For example, exemplary system 100 may comprise a privilege-elevator module 104 for elevating privileges for a process.

Exemplary system 100 in FIG. 1 may also comprise a user-interface module 106 for providing a user interface for prompting a user to elevate privileges when an operating system does not provide an elevation prompt. In addition, as will be described in greater detail below, exemplary system 100 may comprise an administrative-privileges module 108 for determining privileges that are required by a particular process for proper execution.

As illustrated in FIG. 1, exemplary system 100 may also comprise one or more databases 120. For example, exemplary system 100 may comprise a process-identifier database 122 for storing information that may identify a particular process.

In certain embodiments, one or more of modules 102 in FIG. 1 may represent one or more software applications or programs that, when executed by a computing device, may cause the computing device to perform one or more tasks required to elevate the privileges of a process without using an executable wrapper. For example, as will be described in greater detail below, one or more of modules 102 may represent software modules configured to run on one or more computing devices, such as computing system 410 in FIG. 4 and/or portions of exemplary network architecture 500 in FIG. 5. One or more modules 102 in FIG. 1 may also represent all or portions of one or more special-purpose computers configured to perform one or more tasks required to elevate the privileges of a process without using an executable wrapper.

In addition, one or more of databases 120 in FIG. 1 may represent a portion of one or more computing devices. For example, one or more of databases 120 may represent a portion of exemplary computing system 410 in FIG. 4 and/or portions of exemplary network architecture 500 in FIG. 5. Alternatively, one or more of databases 120 in FIG. 1 may represent one or more physically separate devices capable of being accessed by computing system 410 in FIG. 4, and/or portions of exemplary network architecture 500 in FIG. 5.

Figure 2:
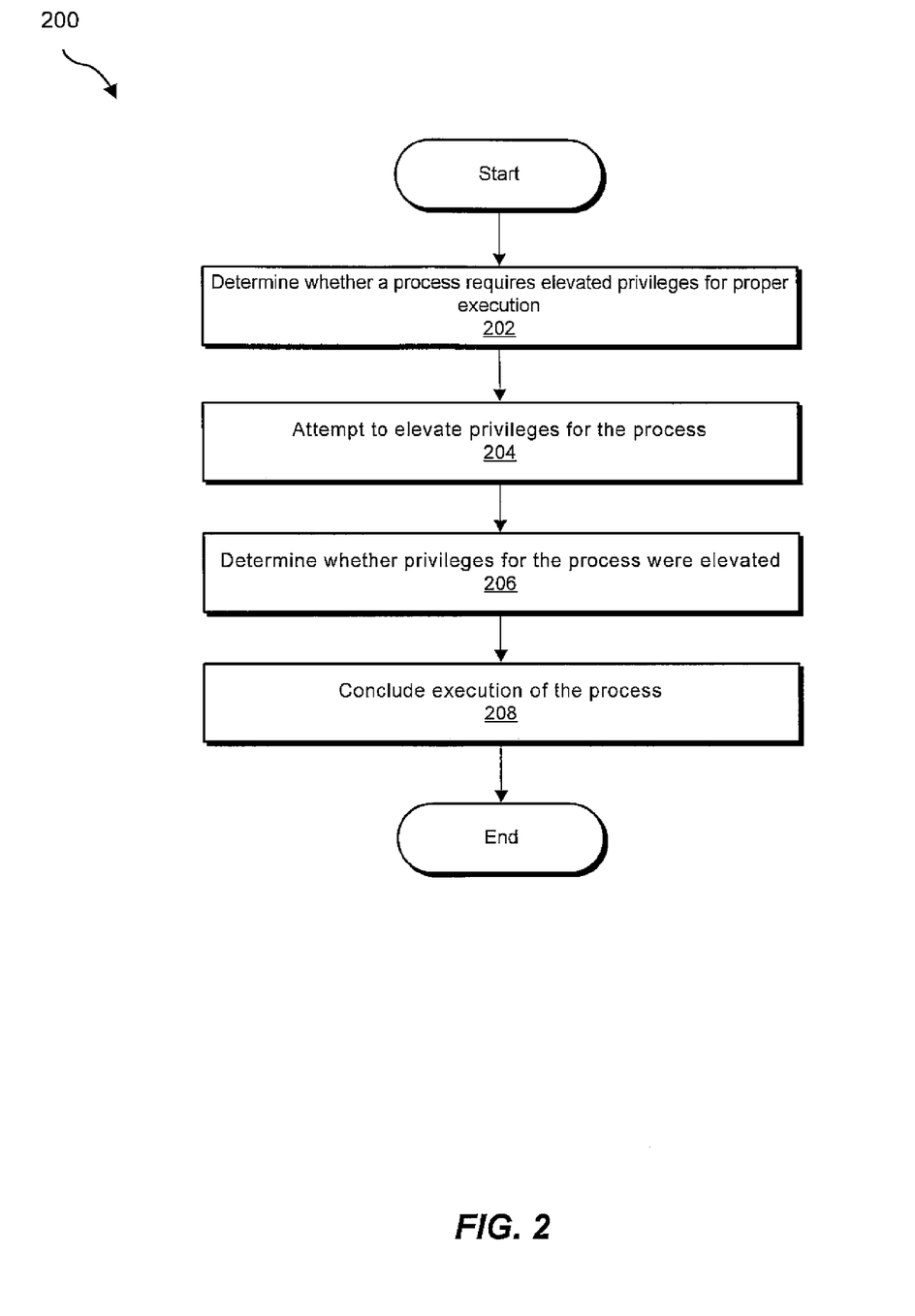
FIG. 2 is a flow diagram of an exemplary computer-implemented method for elevating privileges for a process according to at least one embodiment.

FIG. 2 is a flow diagram of an exemplary computer-implemented method 200 for elevating privileges for a process. As illustrated in this figure, at step 202 the system may determine whether a process requires elevated privileges for proper execution. For example, administrative-privileges module 108 in FIG. 1 may determine whether a process requires elevation of privileges to properly execute. The term "process," as used herein, generally refers to an operation or series of operations that may run on a computing system. Examples of processes include, without limitation, processes that install applications on computing systems, a set of processes, or processes that maintain previously installed applications.

The term "maintain," as used herein, generally refers to any change to a previously installed application. Examples of changes to previously installed applications include, without limitation, an update to an application, a settings change to an application, or any change of any application characteristic. For example, in a WINDOWS environment, a user may command the computing system to change an application via the "Programs and Features" control panel applet. In another operating system environment, a user may command the computing system to change an application in a similar manner. In a further example, a server, or any other computing device, may attempt to change the settings on a client-side computing system.

In one embodiment, administrative-privileges module 108 may determine whether a process requires elevated privileges for proper execution by identifying the current level of privileges for a non-elevated process and comparing the same with the level of privileges that are required by the process for proper execution. The term "proper execution," as used herein, generally refers to a process that executes in the manner intended by the process creator. For example, a process may properly execute when it concludes execution without the occurrence of errors.

If administrative-privileges module 108 identifies differences between these two levels, then administrative-privileges module 108 may determine that the non-elevated process requires elevated privileges before the process can properly execute. Alternatively, if administrative-privileges module 108 determines that the two levels are identical, then administrative-privileges module 108 may determine that the process does not require elevated privileges.

After administrative-privileges module 108 determines that the process requires elevated privileges in step 202, at step 204 in FIG. 2 the system may attempt to elevate privileges for the process. For example, privilege-elevator module 104 in FIG. 1 may elevate privileges for the process.

Step 204 may be performed in a variety of ways. In one embodiment, the system may attempt to elevate privileges for the process by suspending a non-elevated instance of the process and then, while the non-elevated instance of the process is suspended, attempting to spawn an elevated instance of the process.

For example, a non-elevated parent process in a WINDOWS environment may call a custom action after the parent process has been initialized. The term "custom action," as used herein, generally refers to any instruction specified within a WINDOWS installer (e.g., MSI) for calling code stored either inside or outside a package associated with a process. A package generally refers to code associated with a process.

In one example, the custom action may start an elevator process. The phrase "elevator process," as used herein, generally refers to any instruction or set of instructions that elevates privileges for a process. In this example, code for a custom action that starts an elevator process (i.e., a process for elevating privileges) may reside in a DLL that is stored in a WINDOWS installer package. In at least one embodiment, the custom action may exist as a script, an executable file, a DLL, a previously installed application package, or any other form of binary data.

In one embodiment, the elevator process may detect or identify the current level of privileges for the process. If the process has full privileges, then the elevator process may terminate. If the process does not have full privileges, then the elevator process may attempt to elevate privileges for the process. For example, in a WINDOWS environment, an elevator process may check the current level of privileges for the process using the "CheckTokenMembership" function. If the CheckTokenMembership function returns a value indicating that the process has full privileges, then the elevator process may return a value that indicates the presence of full privileges. If the CheckTokenMembership function returns a value that indicates that the process does not have full privileges, then the elevator may attempt to elevate the privileges.

As detailed above, the system may attempt to elevate privileges for a process by suspending a non-elevated instance of the process before attempting to spawn an elevated instance of the process. The term "suspend," as used herein, generally refers to at least temporarily preventing a process from further execution. For example, the computing system may execute a first instruction associated with a process without executing additional instructions associated with the process until some later point in time, if at all, thereby suspending the process. In one embodiment, the computing system may suspend execution of the process by stopping the process. For example, the computing system may prevent any further instructions associated with the process from executing.

In one example, the computing system may store process-identification information for the suspended process (or non-elevated instance of the process) in process-identifier database 122. The phrase "process-identification information," as used herein, generally refers to information that may be used to identify a particular process. For example, process-identifier database 122 may store a hash of the suspended process (or instance of the process), a file size, a file name, a process ID, or any other information that may be useful to distinguish a process.

Process-identifier database 122 may store process-identification information for multiple processes. In one example, process-identifier database 122 may store process-identification information according to the most recently suspended processes. In another example, process-identifier database 122 may store process-identification information according to its associations with other currently running processes.

In one embodiment, the computing system may pause the process (or non-elevated instance of the process). The term "pause," as used herein, generally refers to stopping execution of a process (or non-elevated instance of a process) with the expectation that the process will resume execution without re-initializing the process. For example, the computing system may pause a process (or a non-elevated instance of the process) and then wait until a certain return value is returned by another process before the computing system allows the process to resume execution. For example, in a WINDOWS environment, the computing system may pause execution of a non-elevated process until a spawned elevated process returns a value indicating that it has successfully executed. The phrase "return value," as used herein, generally refers to a value passed from a child process to a parent process.

In another example, the computing system may pause the process at a certain instruction and wait until the process is called by a different process before allowing the process to resume execution. As described above, the computing system may suspend the process by stopping the process, storing an identifier for the process, pausing the process, waiting for another process to return a particular value, any combination of the same, or any other method of process suspension.

Returning to step 204 in FIG. 2, in another example the system may attempt to elevate privileges for the process by attempting to elevate privileges for a non-elevated instance (such as a parent or starting instance) of the process. For example, in a non-WINDOWS environment an elevator process may store identification information for a non-elevated parent process in process-identifier database 122. The elevator process may then run a series of instructions to elevate privileges for the parent process. The elevator process may then use the process identification information stored in process-identifier database 122 to call the parent process and resume execution of the parent process with elevated privileges.

In an additional example of step 204 in FIG. 2, an elevator process may prompt a user to elevate privileges for a process if an operating system of the process (such as a non-WINDOWS operating system) does not provide a user interface or prompt for process elevation. An example of a possible user interface 300 that may be used to prompt a user to elevate privileges for a process in a non-WINDOWS environment is provided in FIG. 3. As illustrated in this figure, user interface 300 may comprise an explanatory textbox 306 and one or more user-selectable objects 302 and 304. In certain embodiments, user-interface module 106 in FIG. 1 may provide user interface 300 in FIG. 3.

Figure 3:
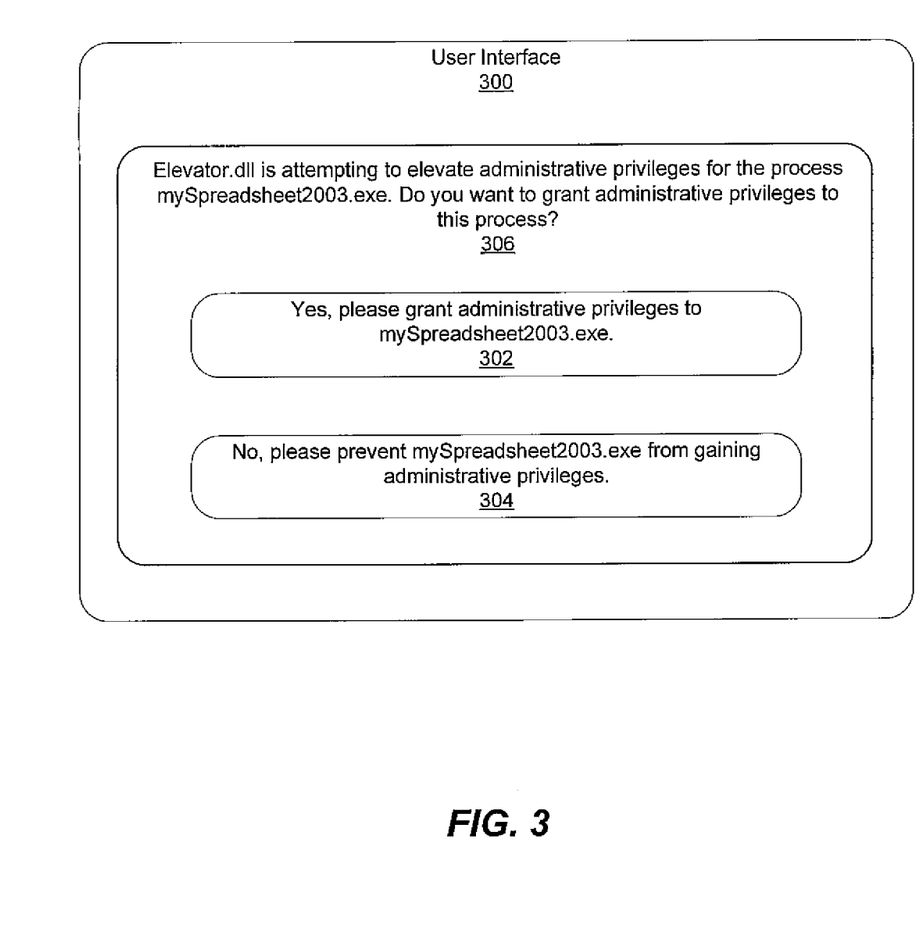
FIG. 3 is a block diagram of an exemplary user interface for elevating privileges for a process according to at least one embodiment.

In one embodiment, explanatory textbox 306 in FIG. 3 may display process information for a process that may aid a user in determining whether to elevate privileges for the process. For example, explanatory textbox 306 may display the name of the process, publisher for the process, execution-location information for the process, security information for the process, or any other information that may aid a user in determining whether to elevate privileges for a process.

After reviewing the process information in explanatory textbox 306, the user may elevate privileges for the process by selecting user-selectable object 302. Alternatively, if the user determines that privileges for the process should not be elevated, then the user may select user-selectable object 304.

In a WINDOWS environment (such as within a WINDOWS VISTA environment), User Account Control (UAC) may prompt a user to elevate privileges for a process. In this example, the elevator process may store information that identifies the process in a temporary file. The WINDOWS operating system may then prompt the user to elevate privileges using UAC. If the user declines to elevate privileges for the process, then the elevator process may return an error code indicating that privileges were not elevated. If the user elevates privileges for the process, the elevated process may cause the process to execute with privileges.

In another embodiment, a separate computing device may elevate the process. For example, a separate computing device may receive a prompt to approve elevation, and the computing device (or a user operating the computing device) may determine whether to allow privileges for the process to be elevated.

In certain examples, the elevator process may acquire reduced privileges. The phrase "reduced privileges," as used herein, generally refers to a level of privileges granted to a process that is less than full administrative privileges. For example, a user may grant partial privileges to the process. Partial privileges may allow the process to access information and computer resources that are not available when there are no privileges granted. However, partial privileges may not allow the process to access all of the information and computer resources that are available when full administrative privileges are granted.

In certain embodiments, when the process is only granted reduced privileges (or no privileges at all), privilege-elevator module 104 in FIG. 1 may modify the process to execute in accordance with the reduced privileges. For example, privilege-elevator module 104 in FIG. 1 may allow the process to execute with less functionality than the process would exhibit with full privileges. In another embodiment, privilege-elevator module 104 may acquire full privileges from administrative-privileges module 108 and allow the process to proceed through normal execution with full privileges.

Returning to FIG. 2, at step 206 in FIG. 2 the system may determine whether privileges for the process were elevated. For example, in a WINDOWS environment privilege-elevator module 104 in FIG. 1 may acquire privileges through the UAC. The elevator process may then spawn a new instance of the process which has elevated permissions since it was created by a process that had previously acquired privileges.

In one embodiment, privilege-elevator module 104 in FIG. 1 may pass a return value that indicates that the process has acquired privileges. As detailed above, the phrase "return value" may refer to a value passed from a child process to a parent process. For example, the elevator process called by the process may pass a return value indicating that privilege-elevator module 104 acquired privileges for the process. In another example, the elevator process may pass a return value indicating that privileges were not obtained. In a further example, the elevator process may pass a return value identifying reduced privileges for the process. In certain embodiments, administrative-privileges module 108 may determine, based on this returned value, whether to allow the process to continue to execute, to stop the process from executing, or to allow the process to execute with reduced privileges.

In certain embodiments, privilege-elevator module 104 in FIG. 1 may return a particular value to the process. In this example, the process may determine (based on the returned value) that it has the necessary privileges in order to resume execution. Alternatively, the process may determine (based on the returned value) that it does not have the necessary privileges to resume execution. In this example, the process may stay in a suspended state until it receives a return value that indicates the presence of the required privileges.

In a WINDOWS environment, if a user approves elevation of privileges for the process (such as via the UAC), then the elevator process may execute the process using information stored in process-identifier database 122. In this example, the process will have elevated permissions since the process was called by a process that already obtained elevated administrative permissions.

Returning to FIG. 2, at step 208 execution of the process may conclude. For example, the computing system may identify the process from process information stored in process-identifier database 122. The computing system may then use this information to call the process. In a WINDOWS environment, a function may use process-identification information stored in a temporary file to call the process. In certain examples, calling the process may resume and conclude execution of the process. In another embodiment, the computing system may pause execution of the process. In this example, the computing system may wait for privilege-elevator module 104 to send a return value that indicates that the process should resume execution.

In a WINDOWS environment, the process may generate an exit code upon conclusion of the process. In certain examples, this exit code may indicate that the process has concluded. Upon receiving this exit code, administrative-privileges module 108 may de-elevate privileges for the process. In another embodiment, the computing system may conclude execution of the process when privilege-elevator module 104 fails to acquire necessary privileges for the process. In a further embodiment, the computing system may conclude execution of the process by executing only those instructions that do not require full privileges to correctly execute. In this example, the computing system may only execute those instructions that are allowed according to the granted privileges. After the computing system concludes execution of the process, exemplary method 200 may terminate.

As detailed above, the exemplary systems and methods described herein may enable a process to elevate for itself without requiring the use of an external process, such as an executable wrapper, that has already been granted elevated privileges. As such, a user may perform a maintenance operation on a previously installed application that requires access to protected computer resources without the use of an executable wrapper. In certain embodiments, the various steps required to elevate a process may be performed (or at the very least, initiated) within the process itself. For example, modules 102 in FIG. 1 may represent a portion of a single process, such as an installation package. Moreover, while some of the systems and methods described herein have been described in connection with a WINDOWS environment, the principles described in the instant disclosure may be applied to many other operating-system environments.

Figure 4:
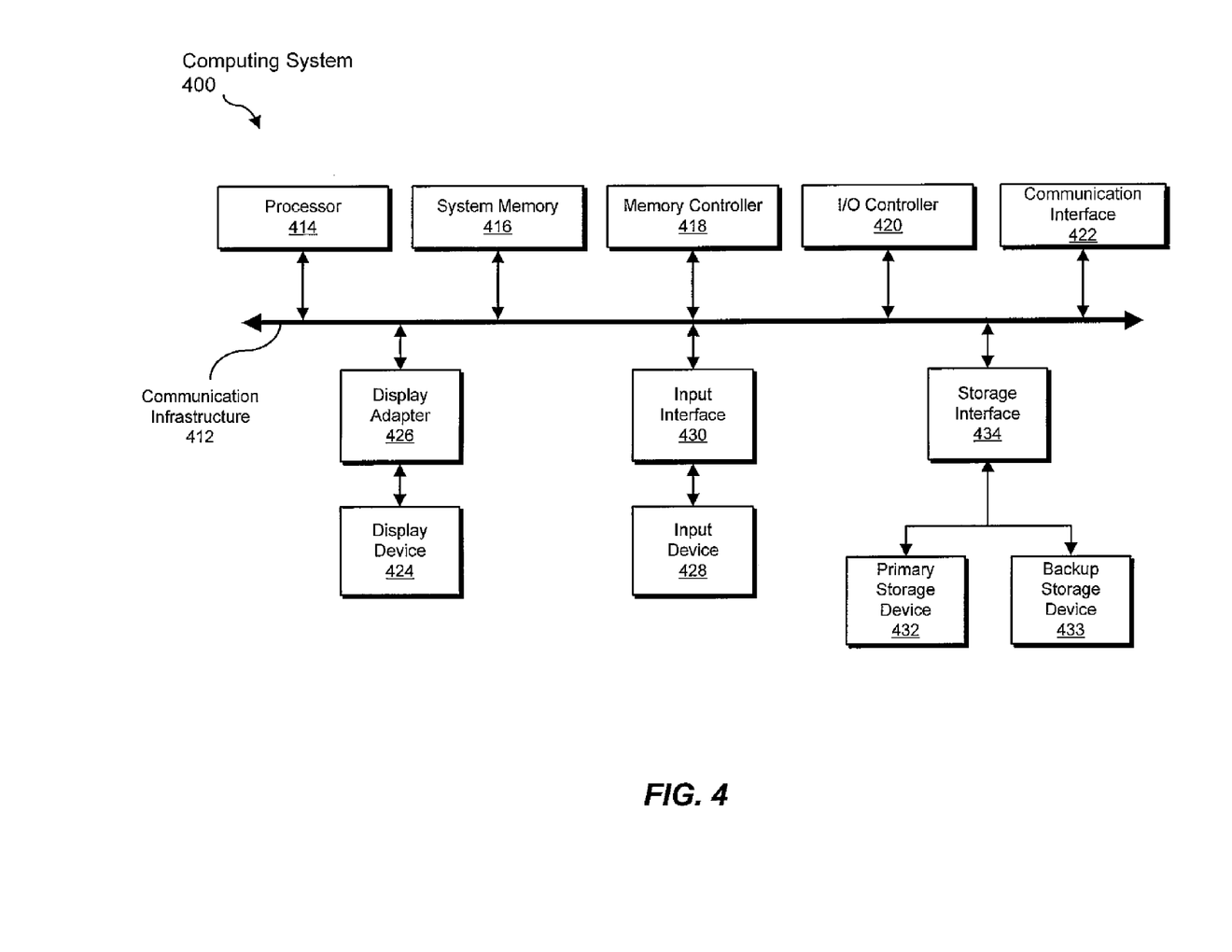
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may comprise at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the determining, concluding, providing, suspending, elevating, attempting, storing, waiting, prompting, receiving, executing, and exiting steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may comprise both a volatile memory unit (such as, for example, system memory 416) and a non-volatile storage device (such as, for example, primary storage device 432, as described in detail below).

In certain embodiments, exemplary computing system 410 may also comprise one or more components or elements in addition to processor 414 and system memory 416. For example, as illustrated in FIG. 4, computing system 410 may comprise a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as determining, concluding, providing, suspending, elevating, attempting, storing, waiting, prompting, receiving, executing, and exiting.

I/O controller 420 generally represents any type or form of module capable of coordinating and/or controlling the input and output functions of a computing device. For example, in certain embodiments I/O controller may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the determining, concluding, providing, suspending, elevating, attempting, storing, waiting, prompting, receiving, executing, and exiting steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network comprising additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USE host adapters, IEEE 494 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the determining, concluding, providing, suspending, elevating, attempting, storing, waiting, prompting, receiving, executing, and exiting steps disclosed herein. Communication interface 422 may also be used to perform and/or be a means for performing other steps and features set forth in the instant disclosure.

As illustrated in FIG. 4, computing system 410 may also comprise at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also comprise at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the determining, concluding, providing, suspending, elevating, attempting, storing, waiting, prompting, receiving, executing, and exiting steps disclosed herein. Input device 428 may also be used to perform and/or be a means for performing other steps and features set forth in the instant disclosure.

As illustrated in FIG. 4, exemplary computing system 410 may also comprise a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also comprise other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, the exemplary file systems disclosed herein may be stored on primary storage device 432, while the exemplary file-system backups disclosed herein may be stored on backup storage device 433. Storage devices 432 and 433 may also be used, for example, to perform and/or be a means for performing, either alone or in combination with other elements, one or more of the determining, concluding, providing, suspending, elevating, attempting, storing, waiting, prompting, receiving, executing, and exiting steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
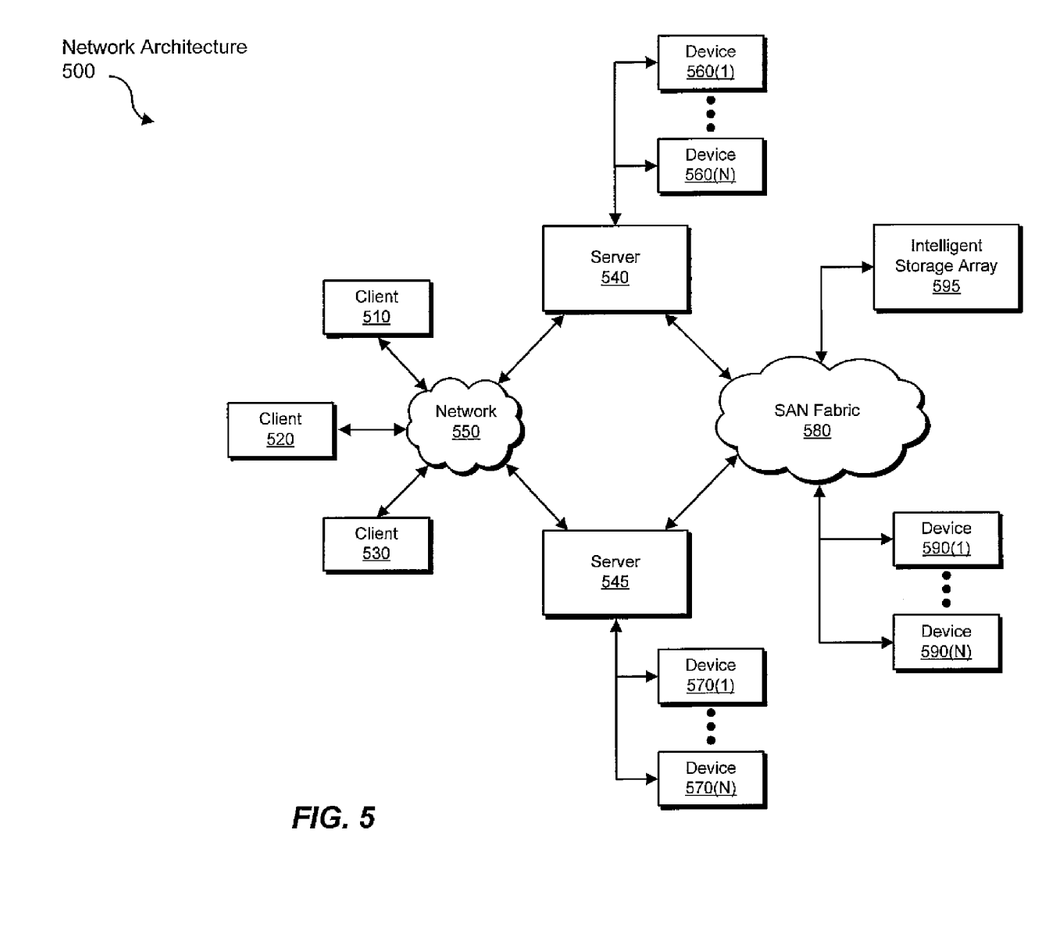
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or to run certain software applications. Network 550 generally represents any telecommunication or computer network; including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the determining, concluding, providing, suspending, elevating, attempting, storing, waiting, prompting, receiving, executing, and exiting steps disclosed herein. Network architecture 500 may also be used to perform and/or be a means for performing other steps and features set forth in the instant disclosure.

As detailed above, computing system 410 and/or one or more of the components of network architecture 500 may perform and/or be a means for performing, either alone or in combination with other elements, one or more steps of the exemplary methods described and/or illustrated herein. For example, a computer-implemented method for elevating privileges for a process may comprise: 1) determining that the process requires elevated privileges for proper execution, 2) attempting to elevate privileges for the process, 3) determining whether privileges for the process were elevated, and 4) concluding execution of the process. In one embodiment, the method may also comprise providing instructions within the process for initializing each step of the method.

In one embodiment, attempting to elevate privileges for the process comprises suspending a non-elevated instance of the process and, while the non-elevated instance of the process is suspended, attempting to spawn an elevated instance of the process. In this example, determining whether privileges for the process were elevated may comprise determining whether the attempt to spawn the elevated instance of the process was successful. In addition, suspending the non-elevated instance of the process may comprise storing process-identification information for the non-elevated instance of the process and waiting for the elevated instance of the process to return a particular value.

In additional embodiments, attempting to elevate privileges for the process may comprise attempting to elevate privileges for a non-elevated instance of the process. In another example, attempting to elevate privileges for the process may comprise prompting a user to elevate privileges when an operating system of the process does not provide an elevation prompt and/or elevating privileges using a separate computing device.

In one example, determining whether privileges for the process were elevated may comprise receiving a return value that comprises an indication of fully elevated privileges, an indication of partially elevated privileges, and/or an indication that privileges were not elevated. In addition, concluding the process may comprise executing all instructions associated with the process, only executing instructions associated with the process that do not require elevated privileges, and/or exiting the process if privileges for the process were not elevated.

In an additional embodiment, concluding the process may comprise receiving a return value that indicates that the process should continue execution and then spawning an elevated instance of the process using stored process-identification information from the process. The process may comprise an installation process, an application-maintenance process, and/or a set of processes.

In one embodiment, a system for elevating user permissions for a process may comprise an administrative-privileges module for determining that the process requires elevated privileges for proper execution. The system may also comprise a privilege-elevator module for attempting to elevate privileges for the process and determining whether privileges for the process were elevated prior to allowing the process to conclude execution. In certain examples, the administrative-privileges module and the privilege-elevator module represent instructions within the process.

In addition, a computer readable medium may comprise one or more computer-executable instructions that, when executed by a computing device, cause the computing device to: 1) determine that the process requires elevated privileges for proper execution, 2) attempt to elevate privileges for the process, 3) determine whether privileges for the process were elevated, and 4) conclude execution of the process.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for elevating privileges for a process, the method comprising:

determining that the process requires elevated privileges for proper execution;

attempting to elevate privileges for the process by:
suspending a non-elevated instance of the process;
while the non-elevated instance of the process is suspended, attempting to spawn a new instance of the process having elevated privileges;

determining whether privileges for the process were elevated by determining whether the attempt to spawn the new instance of the process having elevated privileges was successful;

concluding execution of the process.

2. The computer-implemented of claim 1, further comprising providing instructions within the process for initializing each step of the method.

3. The computer-implemented method of claim 1, wherein suspending the non-elevated instance of the process comprises:
storing process-identification information for the non-elevated instance of the process;
waiting for the new instance of the process having elevated privileges to return a particular value.

4. The computer-implemented method of claim 1, wherein attempting to elevate privileges for the process further comprises attempting to elevate privileges for the non-elevated instance of the process.

5. The computer-implemented method of claim 1, wherein attempting to elevate privileges for the process further comprises at least one of:
prompting a user to elevate privileges when an operating system of the process does not provide an elevation prompt;
elevating privileges using a separate computing device.

6. The computer-implemented method of claim 1, wherein determining whether privileges for the process were elevated further comprises receiving a return value that comprises at least one of:
an indication of fully elevated privileges;
an indication of partially elevated privileges;
an indication that privileges were not elevated.

7. The computer-implemented method of claim 1, wherein concluding the process comprises:
executing all instructions associated with the process;
only executing instructions associated with the process that do not require elevated privileges;
exiting the process if privileges for the process were not elevated.

8. The computer-implemented method of claim 1, wherein:
concluding the process comprises receiving a return value that indicates that the process should continue execution;
spawning the new instance of the process having elevated privileges comprises spawning the new instance of the process having elevated privileges using stored process-identification information from the process.

9. The computer-implemented method of claim 1, wherein the process comprises at least one of:
an installation process;
an application-maintenance process;
a set of processes.

10. A non-transitory computer-readable medium comprising computer-executable instructions that, when executed by a at least one processor of a computing device, cause the computing device to:
determine that a process requires elevated privileges for proper execution;
attempt to elevate privileges for the process by:
suspending a non-elevated instance of the process;
while the non-elevated instance of the process is suspended, attempting to spawn a new instance of the process having elevated privileges;
determine whether privileges for the process were elevated by determining whether the attempt to spawn the new instance of the process having elevated privileges was successful;
conclude execution of the process.

11. The non-transitory computer-readable medium of claim 10, wherein the computer-executable instructions comprise instructions within the process.

12. The non-transitory computer-readable medium of claim 10, wherein the attempt to elevate privileges for the process further comprises attempting to elevate privileges for the non-elevated instance of the process.

13. The non-transitory computer-readable medium of claim 10, wherein the attempt to elevate privileges for the process further comprises at least one of:
prompting a user to elevate privileges when an operating system of the process does not provide an elevation prompt;
elevating privileges using a separate computing device.

14. A system for elevating privileges for a process, the system comprising:
an administrative-privileges module programmed to determine that the process requires elevated privileges for proper execution;
a privilege-elevator module programmed to:
attempt to elevate privileges for the process by:
suspending a non-elevated instance of the process;
while the non-elevated instance of the process is suspended, attempting to spawn a new instance of the process having elevated privileges;
determine whether privileges for the process were elevated by determining whether the attempt to spawn the new instance of the process having elevated privileges was successful;
conclude execution of the process;
at least one processor configured to execute the administrative-privileges module and the privilege-elevator module.

15. The system of claim 14, wherein the administrative-privileges module and the privilege-elevator module comprise instructions within the process.

16. The system of claim 14, further comprising a user-interface module programmed to prompt a user to elevate privileges when an operating system of the process does not provide an elevation prompt.

* * * * *

UNITED STATES PATENT AND TRADEMARK OFFICE
CERTIFICATE OF CORRECTION

PATENT NO. : 8,442,960 B1
APPLICATION NO. : 12/165003
DATED : May 14, 2013
INVENTOR(S) : Kenneth Meyer, Gary Chirhart and Andrew Marks Page 1 of 1

It is certified that error appears in the above-identified patent and that said Letters Patent is hereby corrected as shown below:

In the Claims

Claim 10, at column 16, lines 1 to 4, should read:

A non-transitory computer-readable medium comprising computer-executable instructions that, when executed by at least one processor of a computing device, cause the computing device to:

Signed and Sealed this
Twentieth Day of August, 2013

Teresa Stanek Rea
*Acting Director of the United States Patent and Trademark Office*